(12) United States Patent
Hietasarka et al.

(10) Patent No.: US 8,161,135 B2
(45) Date of Patent: Apr. 17, 2012

(54) DEVICE IDENTIFICATION NUMBER BASED NAME SERVICE

(75) Inventors: Juha Hietasarka, Suinula (FI); Seppo Pohja, Tampere (FI)

(73) Assignee: Nokia Corporation, Espoo (FI)

( * ) Notice: Subject to any disclaimer, the term of this patent is extended or adjusted under 35 U.S.C. 154(b) by 591 days.

(21) Appl. No.: 11/581,458

(22) Filed: Oct. 17, 2006

(65) Prior Publication Data

US 2007/0299941 A1 Dec. 27, 2007

(30) Foreign Application Priority Data

Jun. 26, 2006 (FI) .................................... 20060616

(51) Int. Cl.
G06F 15/177 (2006.01)
G06F 15/16 (2006.01)

(52) U.S. Cl. ....................... 709/220; 709/245

(58) Field of Classification Search .................. 709/220, 709/225, 245
See application file for complete search history.

(56) References Cited

U.S. PATENT DOCUMENTS

| | | | | |
|---|---|---|---|---|
| 6,469,998 | B1* | 10/2002 | Burgaleta Salinas et al. | 370/338 |
| 6,754,895 | B1 | 6/2004 | Bartel et al. | |
| 7,706,401 | B2* | 4/2010 | Bae et al. | 370/466 |
| 2002/0152309 | A1* | 10/2002 | Gupta et al. | 709/225 |
| 2003/0163567 | A1* | 8/2003 | McMorris et al. | 709/225 |
| 2004/0162916 | A1* | 8/2004 | Ryan | 709/245 |
| 2004/0187018 | A1* | 9/2004 | Owen et al. | 713/200 |
| 2005/0015505 | A1* | 1/2005 | Kruis et al. | 709/229 |
| 2005/0021841 | A1* | 1/2005 | Yoshimoto | 709/238 |
| 2005/0039019 | A1 | 2/2005 | Delany | 713/176 |
| 2005/0152275 | A1* | 7/2005 | Laurila et al. | 370/241 |
| 2006/0128377 | A1 | 6/2006 | Murhammer et al. | |
| 2007/0143613 | A1* | 6/2007 | Sitch et al. | 713/171 |

FOREIGN PATENT DOCUMENTS

| | | |
|---|---|---|
| EP | 1359736 A1 * | 11/2003 |
| EP | 1 569 478 A1 | 8/2005 |
| WO | WO 00/21254 | 4/2000 |
| WO | WO 01/86470 A1 | 11/2001 |
| WO | WO 2005/029904 A1 | 3/2005 |
| WO | WO 2006/136028 A1 | 12/2006 |

OTHER PUBLICATIONS

Messerges et al. Digital rights management in a 3G mobile phone and beyond., Proceedings of the 3rd ACM workshop on Digital rights management., Oct. 2003.*
International Search Report for International Application No. PCT/FI2007/050286 filed Jun. 26, 2006.
Airlink Communications, Inc.: "PinPoint EDGE/GPRS" User Guide Feb. 2006, pp. 1-126, XP002586794, Retrieved from the Internet: URL: http://www.industrial-grade-modem.com/Airlink_PinPoint_GPRS_UserGuide.pdf [retrieved on Jun. 11, 2010].

* cited by examiner

*Primary Examiner* — Wing Chan
*Assistant Examiner* — Kostas Katsikis
(74) *Attorney, Agent, or Firm* — Harrington & Smith

(57) ABSTRACT

A method for addressing a client device, wherein a unique identification code, such as a serial number or an International Mobile Equipment Identity code of a mobile device, is attached to the device name. The unique identification code can be used as a part of the name or attached to the name by using additional information field in a name record that is stored on the name server. The rest of the name may be service dependent for allowing an easy automatic generation of the names for providing services, such as automatic updates, to client devices.

9 Claims, 2 Drawing Sheets

DEVICE IDENTIFICATION NUMBER BASED NAME SERVICE

FIELD OF THE INVENTION

The invention relates to mobile devices and networking technology. Particularly, the invention relates to a device name service.

BACKGROUND OF THE INVENTION

Domain name servers were introduced for attaching easy names to IP-addresses. This was because a name would be easier to remember than an IP-address. Domain names are user friendly and they have promoted businesses as the customers can even guess internet addresses for services as the domain names can be descriptive. Thus, practically every computer attached to the Internet has a name that is attached to the IP address of the computer. Domain names are hierarchical and unique. The differentiation is implemented so that within a sub-domain the names of the devices are unique. Thus, each device must have a name that forms a part of the complete domain name.

Recently the mobile devices have been equipped with packet switched networks that can use Internet communication protocols. This has caused a need for IP-addresses and domain names. As mobile devices are not always connected to the Internet, dynamic IP-addresses are suitable for devices. Dynamic IP-addresses are preferred by Internet service providers as the number of IPv4 addresses is limited. However, the customers are willing to maintain the same domain name for their devices even if the IP address changes.

To solve the drawback mentioned above dynamic name services have been introduced. In these services, the device connects to the dynamic name service for providing the new IP-address if the previous address has been changed. Thus, the same domain name can be maintained even if the IP-address changes dynamically. These domain names can be used for contacting the device even if the IP-address changes.

However, these domain names are invented by the users. Thus, the devices are easy to connect when you know the name, but if there is a need for automatic processing, the names must be stored into a database. Furthermore, the domain name as such does not give any information about the device. Thus, additional information about the device must be introduced to the database. This additional information could be, for example, a device type or model. If a certain model requires an urgent update, all of the units could be contacted by using this service. However, the introduction of the additional information to the current systems is a complex task. Thus, there is a need for a solution that solves at least the drawback mentioned above and can be introduced easily to current naming systems.

SUMMARY OF THE INVENTION

The invention discloses a client device identification number based naming service. The identification number may be any unique number within a service. The identification number may be, for example, a serial number of a computer or an International Mobile Equipment Identity (IMEI) code of a mobile device. The unique identification number must be stored into a database when the client device is manufactured. The device has a conventional primary domain name. This domain name is then mapped to the unique identification number. The mapping may be implemented by assigning a secondary name that comprises the unique identification number as a prefix and a constant service name as a suffix. This secondary name is then mapped to the primary name as an alias. In another embodiment, the unique identification number is stored to the primary domain name account or record as additional information. This information can be used as a search criterion. The primary domain name account may comprise a plurality of data records. Furthermore, some implementations allow additional records in a domain name account. Thus, a plurality of records comprising domain name information may be assigned to a single domain name. In this case one of the additional records can be assigned for the information according to the present invention. If there is only one record available, the record must be modified to include the information according to the present invention.

A system according to the present invention includes a client device, unique identification code storage, domain name service and mapping database. Furthermore, a service provider must be included in order to provide services to the devices according to the present invention. The client device has a unique identification code, such as an IMEI code or serial number that is stored to the identification code storage. This storage is typically a database comprising further information about the device. For example, the database could have information about the manufacturing date, operating system version and alike. The unique identification code is then mapped to the conventional domain name that is registered at the domain name service. The mapping may be implemented, for example, as a secondary domain name including the unique identification code, an additional information field at the domain name record or any other way that is suitable for later automatic regeneration of the name. The domain name service and the mapping server may be implemented as an integrated service.

The benefit of the invention is that it is possible to generate network addresses for devices based on the unique identification code. For example, if a mobile device manufacturer notices a need for update in a certain model of mobile device, the manufacturer can retrieve the IMEI codes belonging to these devices and then generate an Internet address for the device. This allows manufacturer initiated updating procedure and the result is more reliable and secured devices as the software is the latest version available.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
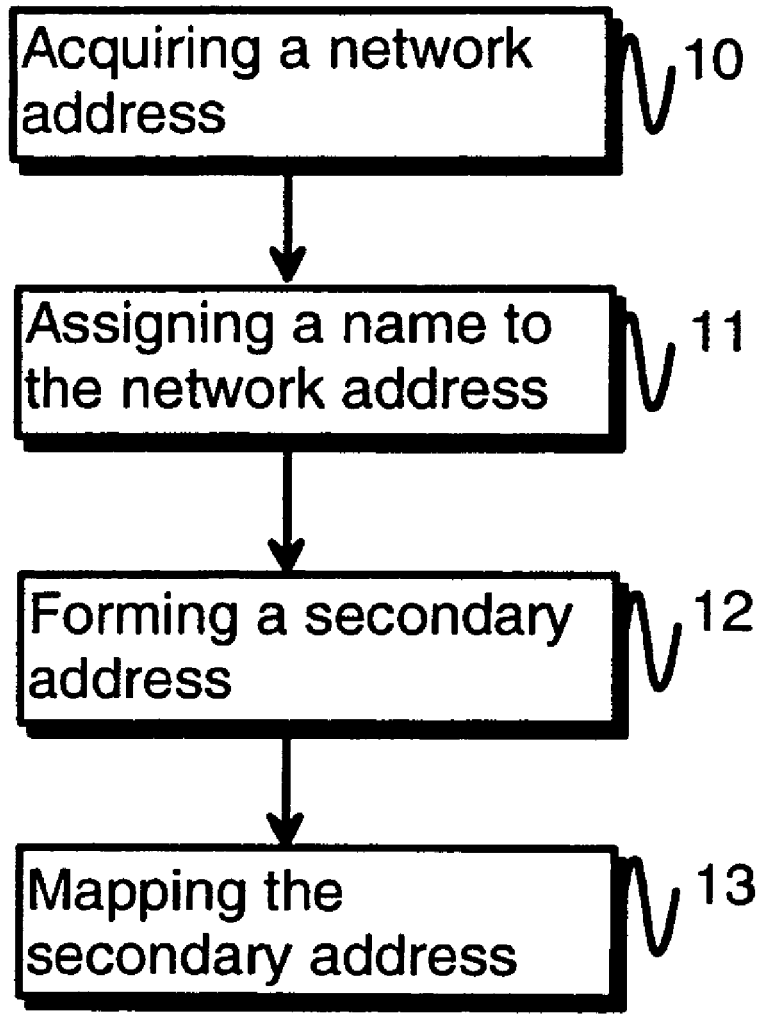
FIG. 1 is a flow chart of a method according to the present invention.

FIG. 1 discloses a method according to the present invention. When a mobile device is connected to the Internet or other data communication network, firstly, a network address is acquired, step 10. Typically this address is an IPv4 or IPv6 address. These addressing schemes are well known to persons skilled in the art. As the addresses are difficult to remember, they are mapped against domain names, step 11.

Typically the domain name is formed by different levels of hierarchy. An example of such a domain name is "myphone.xnokia.com", wherein "myphone" is a name chosen by the user of the device and "xnokia" is a sub-domain of the ".com".

According to an embodiment of the present invention a secondary name is formed by using a unique identification number of the mobile device, step 12. An example of such an identification code is an International Mobile Equipment Identity (IMEI) code that is assigned to each mobile device when the device is manufactured. An example of such an IMEI code is 43241797493445. Thus, an example of a secondary name could be "43241797493445.xnokia.com". Lastly the secondary name would be mapped to the primary name, step 13. Thus, the mobile device could be connected by using two different names. The primary name is chosen by the user and is suitable for human interaction. The secondary name is machine generated and thus, it is suitable for automatic use.

One example of such use is an automatic updating procedure. For example, if there is a need for software update for certain mobile device model, the manufacturer can retrieve the IMEI codes from the database. The database includes information about the device, for example the model and serial number, of the mobile device. Thus, the manufacturer knows which IMEI codes belong to the mobile devices having a need for the update. When the IMEI codes are known, the manufacturer can generate secondary domain names for each mobile device needing the update and can send the update directly to the device.

Figure 2:
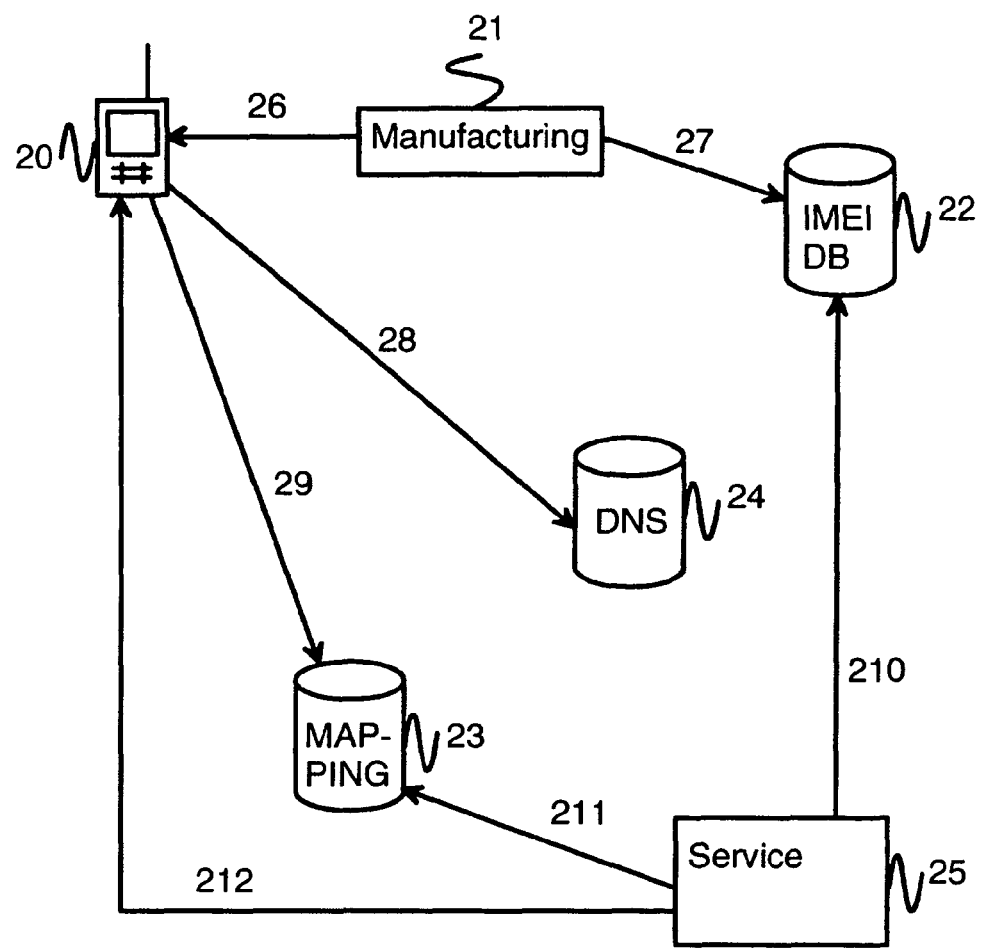
FIG. 2 is a block diagram of an example embodiment of the present invention.

FIG. 2 discloses a system according to an embodiment of the present invention. The system includes a mobile device 20, manufacturing line 21, IMEI database 22, mapping database 23, DNS 24 and service. The manufacturing line 21 refers to the manufacturing process of the mobile device 20. During the manufacturing process an IMEI code is assigned to the mobile device 20. The IMEI code is then stored to the mobile device 20 and IMEI database 22. These steps are indicated by signals 26 and 27. Then the mobile device 20 first registers a conventional domain name at the Domain Name Server (DNS) service 24, as indicated by the signal 28 and forms a unique domain name including an IMEI code and provides it to mapping database 23, as indicated by the signal 29. This domain name is used as a secondary domain name. The mapping information includes the domain name comprising the IMEI code and corresponding conventional domain name. At this stage, the registration process is over. DNS 24 and mapping database 23 may be implemented as one database service.

An example application for the registration mentioned above is a software update that is executed collectively in a plurality of mobile devices. The processing is controlled by updating service 25. First, a request for IMEI codes is sent to the IMEI database 22 as indicated by signal 210. At this stage, devices needing an update are identified. Then the secondary domain name is resolved by contacting mapping database 23 as indicated by signal 211. At this stage the updating service 25 has resolved a working network address for a mobile device 20 and the actual updating service can begin as indicated by signal 211.

In an embodiment of the invention the network elements mentioned above are equipped with software applications that are arranged to implement the unique identification code mapping according to the present invention. For example, the manufacturing line includes software for sending the unique identification code to the database for later use. The mobile device includes a software application for creating an account at a desired service for acquiring a domain name that comprises the unique identification code as a prefix and a service dependent domain name as a suffix for providing a complete name that can be automatically regenerated later. The mobile device can be configured so that it initiates all necessary name registrations automatically when the device is connected to the Internet first time. Furthermore, the service, such as an automatic updating service, is equipped with a software application that can regenerate the device name by using the unique identification code as a part of the name or as searching criteria in the database.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method, comprising:
   in a mobile device, allowing a user to choose a primary domain name for the mobile device, the primary domain name corresponding to an internet protocol address, and registering the primary domain name with a domain name service; and
   in the mobile device, the mobile device generating a secondary domain name for the mobile device, wherein the secondary domain name comprises a unique identification code of the mobile device, the unique identification code set at manufacturing of the mobile device, and registering the secondary domain name and the primary domain name with a mapping database, wherein the registering comprises mapping the secondary domain name to the primary domain name, and
   wherein the unique identification code of the mobile device is an international mobile equipment identity code.

2. The method according to claim 1, further comprising receiving a software update addressed to the mobile device using a network address of the mobile device.

3. The method according to claim 1, wherein the domain name service and the mapping database are a single database service.

4. A method, comprising:
   receiving a primary domain name and a secondary domain name from a mobile device, wherein the primary domain name is chosen by a user, and the secondary domain name comprises a unique identification code set at manufacturing of the mobile device;
   mapping the unique identification code to the primary domain name;
   receiving a signal comprising the unique identification code from a network element; and
   using the mapping from the unique identification code to the primary domain name, sending the primary domain name to the network element, wherein the unique identification code of the mobile device is an international mobile equipment identity code.

5. The method according to claim 4, further comprising assigning a plurality of domain name records to the primary domain name.

6. An apparatus comprising:
   at least one processor; and
   at least one memory including computer program code,
   the at least one memory and the computer program code configured to, with the at least one processor, cause the apparatus to perform at least the following:
   receiving a primary domain name and a secondary domain name from a mobile device, wherein the primary domain name is chosen by a user and the secondary domain name comprises a unique identification code set at manufacturing of the mobile device;

mapping the unique identification code to the primary domain name;

receiving a signal comprising the unique identification code from a network element; and using the mapping from the unique identification code to the primary domain name, sending the primary domain name to the network element, wherein the unique identification code of the mobile device is an international mobile equipment identity code.

7. The apparatus according to claim 6, wherein the secondary domain name comprises a domain name record.

8. A non-transitory computer-readable medium with an executable program stored thereon, wherein the program instructs a microprocessor to perform the following:

receiving a primary domain name and a secondary domain name from a mobile device, wherein the primary domain name is chosen by a user, and the secondary domain name comprises a unique identification code set at manufacturing of the mobile device;

mapping the unique identification code to the primary domain name;

receiving a signal comprising the unique identification code from a network element; and using the mapping from the unique identification code to the primary domain name, sending the primary domain name to the network element, wherein the unique identification code of the mobile device is an international mobile equipment identity code.

9. A mobile device comprising:

at least one processor; and at least one memory including computer program code, the at least one memory and the computer program code configured to, with the at least one processor, cause the mobile device to perform at least the following:

allowing a user to choose a primary domain name for the mobile device, the primary domain name corresponding to an internet protocol address, and registering the primary domain name with a domain name service; and generating a secondary domain name for the mobile device, wherein the secondary domain name comprises a unique identification code of the mobile device, the unique identification code set at manufacturing of the mobile device, and registering the secondary domain name and the primary domain name with a mapping database, wherein the unique identification code of the mobile device is an international mobile equipment identity code.

* * * * *